United States Patent [19]

Stedtnitz

[11] 3,727,178
[45] Apr. 10, 1973

[54] ECHO SOUNDING DISTANCE MEASUREMENT METHOD AND APPARATUS

[75] Inventor: Wolfgang Stedtnitz, Neukrug, Germany

[73] Assignee: Fried. Krupp Gesellschaft mit beschrankter Haftung, Essen, Germany

[22] Filed: Sept. 8, 1971

[21] Appl. No.: 178,658

[30] Foreign Application Priority Data

Sept. 12, 1970  Germany.................P 20 45 276.0

[52] U.S. Cl. .............................................340/3 R
[51] Int. Cl. ..............................................G01s 9/68
[58] Field of Search ..................340/3 A, 3 D, 3 R, 340/3 F, 1 R, 5 S, 6 R

[56] References Cited

UNITED STATES PATENTS 2,965,876  12/1960  Meunier et al. .....................340/3 R
3,484,737  12/1969  Walsh ..................................340/3 R
3,603,920  9/1971  Stedtnitz .............................340/3 D Primary Examiner—Richard A. Farley
Attorney—George H. Spencer et al.

[57] ABSTRACT

A method and apparatus for measuring the length of the component in a predetermined direction of a distance to a point through a sound transmitting medium by radiating a narrow beam of sound energy from an electroacoustic transducer array of the type which produces a beam whose angular direction is a function of the frequency of the excitation signals applied thereto, directing the beam toward the point at a predetermined angle to the component direction and providing a length indication based on a combined function of the elapsed time between transmission of the beam and reception of its reflected version and the frequency of the signals supplied to the transducer array.

18 Claims, 11 Drawing Figures

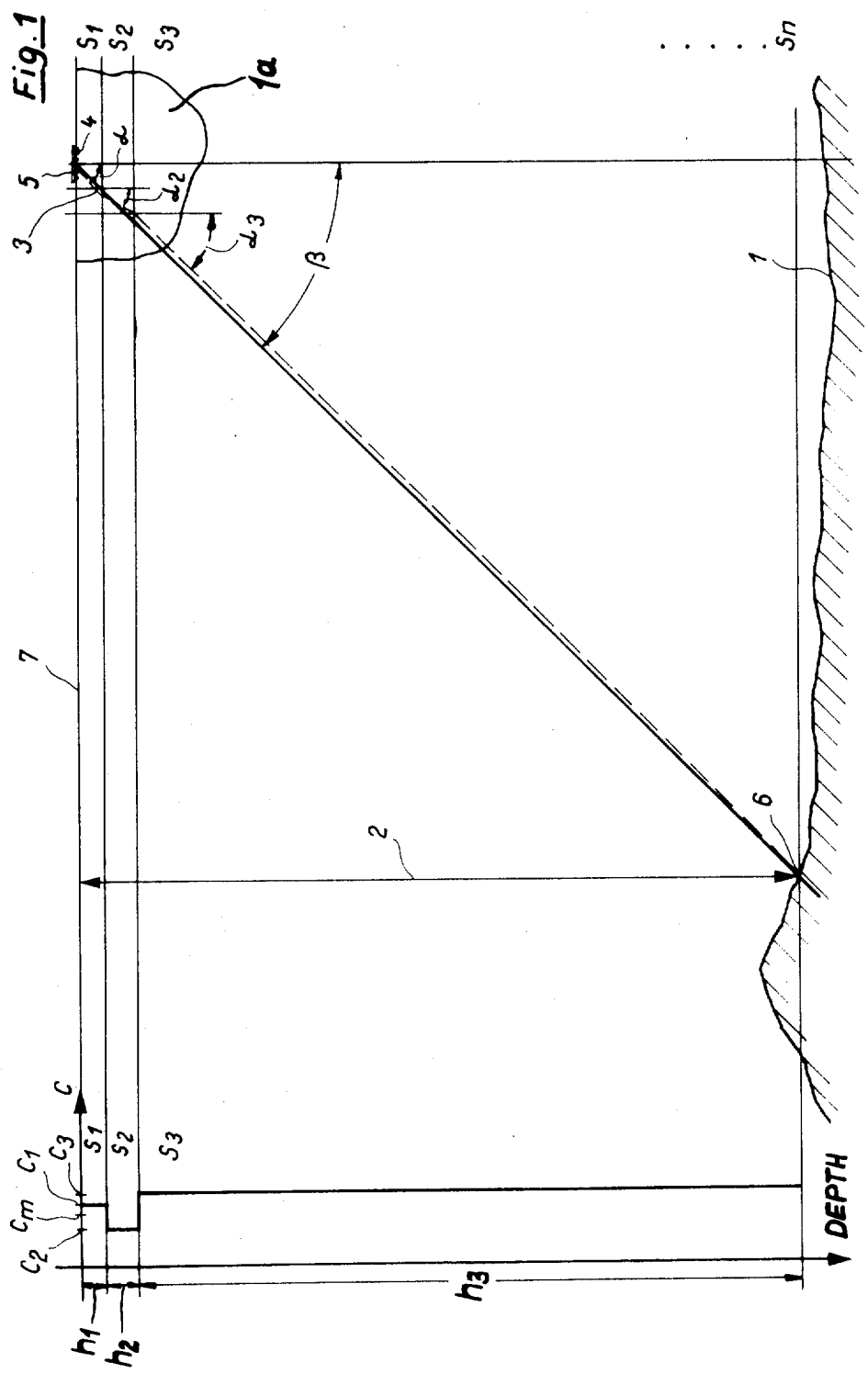

ECHO SOUNDING DISTANCE MEASUREMENT METHOD AND APPARATUS

BACKGROUND OF THE INVENTION

The present invention relates to a method and apparatus for determining distance according to the reflected beam technique by measuring the time which elapses between the instant of transmission of sound energy and the instant of reception reflected components of this sound energy, particularly through sound energy transmitting media having layers possessing different wave transmission characteristics.

It is common practice to effect distance measurements by transmitting sound energy directly, and over the shortest possible path, to the location whose distance is to be measured and receiving the energy reflected from that location. The time expired between transmission and reception, multiplied by the propagation speed of the sound energy in the transmitting medium, is equal to twice the distance to be determined, which is the distance between the point of transmission and the point of reflection.

Since sound energy propagates at a speed which depends on the nature of, and conditions in, the medium, the knowledge of the propagation speed in this medium is the predominantly decisive factor to the accuracy of the distance measurement, aside from possibly occurring timing errors. It is particularly difficult to obtain an accurate distance measurement in media composed of layers having different wave transmission characteristics, such as for example, in depth sounding through ocean water whose temperature and salt content, which, inter alia, both influence the wave transmission behavior and thus the sound propagation speed, vary, often rapidly, from one depth to another.

A determination of the temperatures in the different layers at each location is possible with known bathyprobes. This process, however, is time-consuming and expensive since the probe is lost with each measurement. For distance determinations in the form of depth soundings in ocean water for the purpose of recording depth profiles, the measured echo sounding time intervals must be evaluated on the basis of the known propagation speeds of the individual successive layers. This is also complicated and time-consuming, and thus expensive. Moreover, the bathyprobe only determines the temperatures of the layers, while the propagation speed actually also depends on other factors. Since these other factors would be even more complicated and expensive to determine, even those compiling very accurate official oceanographic charts limit themselves to determining the temperature layers only in a certain area of the ocean by means of a bathyprobe and to calculating therefrom the average speed of sound for the depth sounding, which average speed is also used as the basis for further measurements.

The time interval between transmission and reception of the sound energy is then computed at each measuring location together with this average speed of sound to determine the distance, i.e. depth, of interest. The measuring accuracies which can be obtained by this technique are for example, of the order of magnitude of 10m to 20m for distances of 700m to 800m, as will be shown below with the aid of numerical examples.

A review of the state of the art in the field of depth sounding appears in "The International Hydrographic Review", July 1970, Vol. XLVII, No. 2, pages 85–106.

While commercial shipping has had to be satisfied with the fact that even the best ocean charts offer no better accuracy, this drawback of the conventional method of ocean depth determination is particularly noticeable in connection with present world-wide attempts to determine the formations of natural resources at the bottom of the ocean, as well as in construction projects, when laying pipelines and cables and in any engineering endeavor in this field. It is also desired to overcome this drawback, however, in less complicated projects. For example, it has thus far been impossible, due to a lack of measuring accuracy, to produce automatic tide level or other liquid level measuring systems by means of the echo sounding technique. In the control of waterways or for regulating bucket elevators and high water locks where, because of the large amounts of water involved, the required measuring and control accuracies are of the order of centimeters, while changes in the water level are quite considerable, it was thus far necessary to employ mechanical or electromechanical solutions. Therefore, costly construction, e.g. for water level measuring houses, and maintenance expenses had to be accepted.

SUMMARY OF THE INVENTION

It is therefore an object of the present invention to provide a distance measuring method which leads to greater measuring accuracy than the conventional methods.

Another object is to reduce the cost of such measurements.

To solve this problem, the present invention utilizes my earlier proposal, disclosed in my pending U.S. applications, Ser. No. 850,146, filed Aug. 14, 1969, now U.S. Pat. No. 3,603,920, and Ser. No. 120,608, filed Mar. 3, 1971, to radiate sound energy from a planar group of transducer elements by means of phase control of the group in such a manner that the energy transmission axis is inclined at an angle to the vertical so that inclined lobe diagrams are obtained for effecting a Doppler determination according to the Janus method. Calculations showed that changing propagation speeds in layers having different wave transmission characteristics lead to different angles for the propagation of the sound energy, such that the Doppler frequency is determined independently of the frequency and propagation speed of the radiated sound energy.

The present invention is based on the discovery that the functional relation which was previously found to exist between the angle, frequency and propagation speed of the radiated sound energy can be used for achieving an accurate distance determination in media having layers of differing propagation speeds, so as to eliminate errors which previously occurred in distance determinations made according to the echo method by measuring the time expired between transmission and reception of the sound energy.

The present invention is carried out in such a way that, in a known manner, sound energy is emitted in beams from a plurality of individual transducer elements which are disposed in equidistant groups in a plane perpendicular to the direction along which the distance is to be determined and which are controlled with respect to one another with variable frequencies and a constant phase shift. The radiation axis lies at a given angle to this direction. The time interval which is determined without taking into account differences in the wave transmission behavior of the individual layers, but taking account of the instantaneous frequency, is a direct measure for the distance to be determined between the point of reflection of the sound energy and the plane.

For a propagation of sound energy of one frequency through a medium having layers of different wave transmission characteristics, the relation between the angles at which the sound energy propagates in the individual layers, and their propagation speeds, which also vary from layer to layer, is defined by a quotient, formed, for each layer, by dividing the sine of the angle by the propagation speed. This quotient does not change from layer to layer, but rather stays always constant, for a constant frequency for the radiated sound energy. The measured time interval between transmission and reception is then multiplied only by a factor proportional to the instantaneous frequency of the radiated sound energy, and this provides an indication of the distance to be measured.

If the measured distances are displayed by an electromechanical recording system employing a digital display based on a frequency dependent time base which is proportional to the frequency of the radiated sound energy, a display scale results for the distances which is independent of the momentarily selected frequency and which is determined only by the sine of twice the average angle of the axis of the radiated sound energy during its travel through the different layers of the medium. The frequency is so selected that the inclination of the radiated sound energy relative to the direction of the distance to be determined is always an average of 45° so that the value of the sine of twice the angle is always about 1.

With changes in the wave transmission characteristics of the layers during several measurements, for example in compiling an ocean depth profile, the value of the sine of twice the angle changes only insignificantly, so that the only errors remaining are negligibly small. Because the display scale is independent of frequency, the frequency can be freely varied to so set the direction of radiation of the sound energy that, even if the characteristics of the medium change substantially, the average inclination of the sound energy to the direction of the distance to be determined is always about 45° without any change occurring in the recording since the display scale is independent of the frequency. The frequency dependence of the time base of the distance determination will be mathematically proven below with the aid of diagrams presented in the drawings.

The phase controlled operation of transducer elements in a group to obtain a direction of radiation of the sound energy which is inclined to the normal to the plane of the transducer elements is, as already mentioned, known per se. It is employed, for example for the purpose of pivoting directional characteristics to effect a travel time compensation in sonar systems.

The use of a directional characteristic which is emitted at an angle to the normal to the transducer plane, preferably an angle of 45°, has already been proposed.

It is used as a characteristic in addition to the vertical sounding in order to be able to safeguard a towed net by a comparison of both associated echo signals which indicates changes in the consistency of the ocean bottom. However, none of the numerous proposals and solutions for inclined sounding has thus far been based on the problem, and most of all realization, of the present invention which makes it finally possible to overcome the inadequacies in prior ocean depth measurement techniques.

The idea on which the present invention is based of pivoting a beam in dependence on the speed of sound depends on the provision of a constant electric phase difference, e.g. 90° or 120°, between two transducer elements. Thus the present invention solves the problem of determining distance, and particularly of measuring depth in that the measurement is no longer made in the conventional manner by directing sound to a point of reflection in the direction of the distance of interest, but rather by directing the sound at an angle to the distance to be measured.

Since concentration of the sound energy cannot be obtained with any desired sharpness, and since the conditions at the point of reflection influence the dispersion of the reflected components of the sound energy, it is advantageous to make the measurement of the time interval each time with reference to the median point of the duration of the transmitted or reflected sound energy.

The recording of the time interval, and thus of the distance determination, can be made electronically or electromechanically in any known manner.

In the case of a purely electronic measurement of the time interval, for example, counting pulses having a defined repetition frequency are counted into a time meter constituted by a digital counter. The repetition frequency is determined from the variable employed for controlling the transducer elements, so that the above-mentioned frequency proportional factor is already considered and the display scale becomes frequency independent. Otherwise, according to the prior art, this factor would be multiplied by the transmission-reception time interval to produce a distance indication. Moreover, the frequency of the counting pulses determines the resolution of the digital distance determination. The number of counting pulses in the digital counter then directly indicates the distance which has been determined, which can then be displayed or printed.

The location of the point of reflection is determined from the arbitrarily obtained instantaneous position of the transducer elements plus a path in the plane of the transducer elements which is calculated based on a consideration of the angle of the radiated sound energy from the direction of the instantaneously determined distance.

The determination of the path and the addition of this path and the position of the transducer elements may be accomplished electronically. The calculated location of the point of reflection is subsequently displayed, printed, or otherwise evaluated together with the computed distance.

However, the distance to be determined and the location of the point of reflection can also be indicated graphically by means of an electromechanical recording device of the known echograph type with linear movement of a recording member in the form of a stylus fastened on a stylus band. The sequence of independent coordinates which correspond to the positions of the transducer elements are indicated on a line parallel to the direction of advancement of the recording paper. However, contrary to the conventional devices of this type, and according to a further feature of the invention, the stylus, in order to mark the location of the point of reflection, moves, not at an angle of 90° to the direction of advancement of the paper but at an angle $\gamma$, which is selected on the basis of the angle of the radiated sound energy and the display scale for the position coordinate of the transducer elements, as will be shown below with the aid of the drawings for an embodiment of the invention. The stylus band is driven by a motor whose speed is controlled to be proportional to the variable frequency for controlling the transducer elements so that the abovementioned frequency proportional factor is automatically considered again and the display scale becomes frequency independent. This results in a recording from which the locations of both the point of reflection and the transducer elements can be seen directly and to scale.

In the case of an ocean floor profile measurement, the location of the transducer elements which are disposed on a surveying ship are known from the position of this surveying ship, which is determined in the conventional manner, for example by the hyperbolic navigation method. When the above-mentioned recording device is employed, the paper advances in synchronism with the speed of the surveying ship, taking into consideration the display scale.

It is also possible, however, to display the distance to be determined and the location of the respective point of reflection with an unmodified echograph of known construction in that in a further feature of the present invention sound energy is radiated alternately, or simultaneously, at the same angle as, but in the opposite direction from, the first sound energy radiation, with respect to the normal to the plane of the transducer elements. In the example of ocean depth measurement, this means that the sound energy is emitted both toward the bow and stern of a ship at the same angle to the vertical. Preferably, a three-phase generator then controls the transducer elements with two oppositely directed superimposed, or alternating, phase sequences. The time intervals between transmission and reception of the sound energy are then registered by a stylus for both radiation directions. The speed of the stylus, which is fastened on a stylus band, is here also controlled to be proportional to the variable frequency employed for controlling the transducer elements.

While the surveying ship follows a given course, each point of reflection is covered twice in a row and the distance to be determined is recorded twice true to scale, i.e. the depth profile is recorded twice.

The individual points of reflection of each one of the two recorded depth profiles, however, are here not recorded at their true locations, since with the given stylus movement and because of the inclined radiation of the sound energy the true locations of the points of reflection with respect to the location of the transducer elements depend on the value of the distance to be determined itself. Thus, the time of the second covering of each point of reflection also depends on its depth, i.e. its distance from the plane of the transducer elements. If, however, it is again assumed that the paper advance speed is in synchronism with the displacement of the transducer elements, the exact location of the measured distance can be determined by averaging the position coordinates of identical points of reflection on both depth profile recordings. By forming an average of the two recorded distances of each actual point of reflection, random measuring errors which might possibly still be contained in the distance determination are cancelled out.

A further important field of application for the distance determination according to the present invention is in the measurement of fill levels, for example liquid levels in containers or depth levels of bodies of water. The transducer elements, for example in the measuring of depth levels, are according to a further feature of the present invention, preferably permanently installed at the bottom of the water body. The obliquely emitted sound energy is reflected from the surface of the water, which is never quite smooth. The time interval between transmission of the sound energy and reception of reflected components thereof provides an accurate measure of the water level and can be electronically evaluated, and displayed or recorded after telemetric transmission, for example over cables or radio links.

The particular advantage of the distance determination according to the present invention is that the propagation speed of the sound does not become a part of the distance determination so that accurate measurements are made possible particularly in the case, which is frequent and annoying in practice, when media are present which have layers with different wave transmission characteristics. Thus, it is possible, without significant further expenditures compared to the conventional echo sounding surveying systems, to obtain a measuring accuracy which was not even approximately obtainable with devices operating according to prior art methods. Particularly in the hydrographic art, the use of the method of the present invention permits the construction of new systems of greater accuracy without the requirement for maintenance and wear control, e.g. for the monitoring of the water levels in drainage systems such as bucket elevator systems.

BRIEF DESCRIPTION OF THE DRAWINGS

FIG. 1 is a pictorial view of an ocean depth profile to be surveyed.

DESCRIPTION OF THE PREFERRED EMBODIMENTS

FIG. 1 illustrates an ocean depth profile 1 which is to be surveyed. Previously it has been the custom to determine distances, such as the depth in this case, by vertical sounding. To achieve a good measurement, the temperature layers at a measuring location are first recorded with the aid of a bathyprobe. With the use of calculating tables the different propagation speeds C1 . . . Cn of the sound energy are obtained for the individual layers at these temperature values. At the left-hand side of FIG. 1 there is shown a distribution of three layers S1, S2 and S3 throughout a distance 2 equal to 750m. The layer depths are h1, h2 and h3, respectively. The distribution of the propagation speeds C1, C2 and C3 assumed to exist here corresponds to a usable approximation, to an average propagation speed $Cm = 1500$ m/sec throughout the entire distance 2. According to the conventional method, the sum of the three time intervals $t1$, $t2$ and $t3$ through the respective layers S1, S2 and S3 is measured and multiplied by the average speed of sound.

The following results:

Distance $2 = \frac{1}{2} (t1 + t2 + t3) Cm$
$= \frac{1}{2} (h1/C1 + h2/C2 + h3/C3) Cm$.

For a typical situation, distance 2 is measured to be 736.65 m

Since, however, the true value of distance 2, according to the sketch, equals 750 m, this measurement results in an error of 13.55 m, which corresponds to an error of 1.78 percent. Errors of this order of magnitude are common with the measuring methods of the prior art and have thus far been unavoidable. The present invention reduces such measuring errors quite considerably.

Figure 1A:
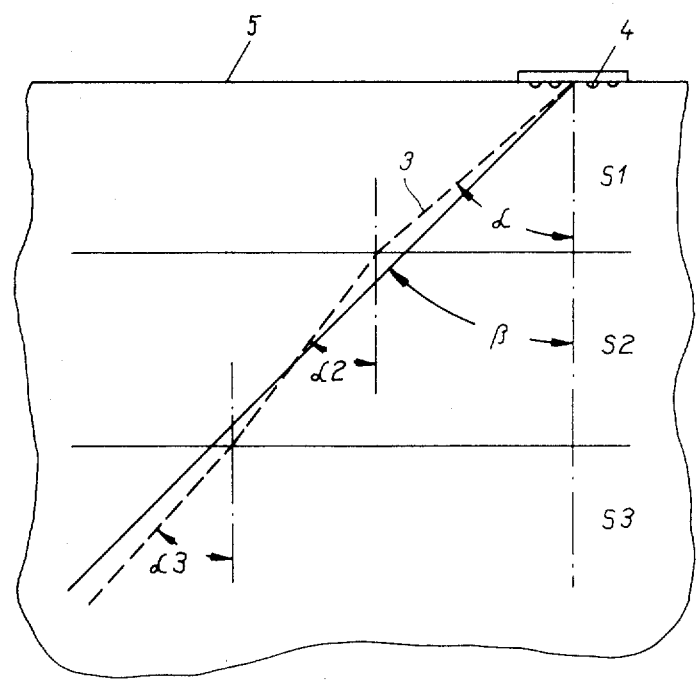
FIG. 1a is an enlarged detail view of a region 1a of FIG. 1.

In order to determine the same distance 2, the present invention provides that a beam 3 of sound energy, as shown in FIG. 1a, is radiated at an angle $\alpha$ to the vertical by transducer elements 4 which are disposed on a plane 5 perpendicular to the direction of the distance 2 to be determined As a result of refraction of the sound energy beam 3 at the interfaces of layers S1 . . . Sn having different wave transmission characteristics, a connecting line between the point 6 of the ocean bottom struck by the beam and transducer elements 4 is inclined to the normal to plane 5 at an angle $\beta$.

The following relationships, based on Snell's law, are utilized for the method according to the present invention:

$$\sin\alpha/C1 = \sin\alpha 2/C2 = \ldots = \sin\alpha n/Cn$$

$$\sin\alpha/C1 = \sin\beta/Cm = A,$$

where $A$ is a constant
i.e., the value of angle $\alpha$ and thus the path which the sound energy traverses in each of the individual layers S1 . . . Sn, decreases in proportion to the decrease in the propagation speed $C$ in that layer.

This shows that a constant angle $\beta$ and an average speed of sound $Cm$ can be used for the distance determination when the sound energy is radiated at an angle to the normal to plane 5. The measured time interval between transmission and reception of sound energy beam 3 does not result directly in the desired distance 2. Rather, this distance is determined, taking into consideration the value of angle $\beta$, from the following relationships:

$$\text{Distance } 2 = \frac{1}{2} Cm \cdot \cos\beta \cdot t$$

$$= \frac{1}{2} (Cm \cdot \sin\beta)/(\sin\beta) \cdot \cos\beta \cdot t,$$

where $\sin\beta/Cm = A$, or $$\text{Distance } 2 = \frac{1}{2} (\sin\beta/A) \cdot \cos\beta \cdot t$$

$$= \frac{1}{4} (\sin 2\beta/A) \cdot t,$$

for $(\sin\beta \cdot \cos\beta) = \frac{1}{2} \sin 2\beta$.

It is known that the following relation exists between angle $\alpha$ and the frequency $f$ of the radiated sound energy of beam 3:

$$\sin\alpha/C\,1 = A = 1/(3 \cdot a \cdot f) = \sin\beta/Cm,$$

the term a being the distance between two adjacent transducer elements 4 which are fed with signals differing in phase by 120°. Thus it results:

$$\text{Distance } 2 = (\tfrac{3}{4}) \cdot a \cdot \sin 2\beta \cdot f \cdot t = Kt,$$

$$K = (\tfrac{3}{4}) \cdot a \cdot \sin 2\beta \cdot f,$$

$K$ being the earlier-mentioned frequency proportional factor.

When distance 2 is determined by means of an electronic time measuring device, a number $n$ of counting pulses having a repetition frequency $f1$ is counted during time $t$, so that a display scale $$M1 = (\text{distance } 2/n) \text{ results.}$$

The frequency $f1$ is selected to be proportional to the frequency $f$ of the radiated sound energy, the proportionality factor, or dividing ratio, $u$ being equal to $f/f1$.

The number n of counting pulses counted during time $t$ is then $n = t \cdot f1 = (t \cdot f)/u$,
and thus it results for the display scale M1:

$$= [\tfrac{3}{4} \cdot a \cdot \sin 2\beta \cdot f \cdot t]/[2\pi \cdot r \cdot (f/u) \cdot t]$$

$$M\,1 = \tfrac{3}{4} \cdot a \cdot u \cdot \sin 2\beta.$$

The display scale M1 is thus independent of frequency $f$ with a selected frequency dependent time base constituted by the repetition frequency $f1$.

As indicated in connection with the above derivation, angle $\alpha$, and thus indirectly angle $\beta$, can be varied by varying the frequency $f$ of the sound energy to be radiated.

The trigonometric component, i.e. $\sin 2\beta$, in the display scale can then be set to be equal to one, to a very good approximation, when angle $\beta$ is approximately 45° since the value of the sine function in the vicinity of an angle value of $\pi/2$ is almost constant.

For recording distance 2 by means of an electromechanical recording device in the form of a conventional echograph, the display scale M2 is defined by the ratio of the distance 2 to a path which the recording member, in the form of a stylus, traverses at a speed $v$ during time $t$. Thus:

$$M\,2 = \text{distance } 2/s$$

The stylus is usually fastened on a stylus band which is driven by a motor via a guide roller having a radius $r$. The number of revolutions of the motor determines the speed $v$. The speed is controlled by frequency $f1$ so that the following speed $v$ results:

$$v = 2\pi \cdot r \cdot f1,$$

$$f1 = f/u$$

$$v = 2\pi \cdot r \cdot f/u.$$

During time t the stylus traverses path $s$ having the length:

$$s = v \cdot t = (2\pi \cdot r \cdot f)/(u) \cdot t.$$

Thus the following results for display scale M2:

$$M\,2 = \text{distance } 2/s$$

$$= [\tfrac{3}{4} \cdot a \cdot \sin 2\beta \cdot f \cdot t]/[2\pi \cdot r \cdot (f/u) \cdot t]$$

$$= [\tfrac{3}{4} \cdot a \cdot u \cdot \sin 2\beta]/[2\pi \cdot r]$$

Here too the display scale is frequency independent and determined only by known structural values if angle $\beta$ is always an average of approximately 45°.

When distance 2 is recorded by means of an echograph in which the direction of movement of the stylus is not perpendicular to the paper advance direction, but rather at an angle $\gamma$ thereto, the display scale M3 is calculated as follows:

$$M3 = \text{distance } 2/(v^* \cdot t)$$

when the speed $v$ of the stylus is $$v = (2\pi \cdot r \cdot f)/u$$

This speed $v$ must now be converted, taking into consideration the angle $\gamma$, to:

$$v^* = v \cdot \cos \gamma,$$

so that the following results for the display scale M3:

$$M\,3 = [\tfrac{3}{4} \cdot a \cdot \sin 2\beta \cdot f \cdot t]/[2\pi \cdot r \cdot (f/u) \cdot \cos \gamma \cdot t]$$

$$M\,3 = [\tfrac{3}{4} \cdot a \cdot u \cdot \sin 2\beta]/[2\pi \cdot r \cdot \cos \gamma]$$

Here, too, all values which determine the display scale M3 are structurally determined.

For the development of a device for performing the method of the present invention it is advisable to start with the assumption that, in the area of the ocean to be surveyed, the layers with their different wave transmission characteristics have been once determined at a representative point and that the angle $\alpha$, shown in FIG. 1a, has then been set by selecting the value of the frequency $f$ so that the crooked line constituting the refracted sound energy path results in an angle $\beta$, as shown in FIG. 1, of approximately 45°.

Error calculations now have shown that it is even sufficient, according to the present invention, to adopt only a few standard values based on initial tests or existing data, for the average sound propagation speed, to determine the corresponding frequencies $f$ for the sound energy radiation, and to permanently preset these frequencies so that any one of them can be subsequently selected. Then determination of the then existing conditions of the layers in the ocean becomes entirely unnecessary since it is sufficient, within the range of the obtainable measuring accuracies, to select the best one of these few given frequencies $f$ for the measurement, the selection depending on the typical sound energy propagation speed, based on experience, for the area of the ocean in which the measurement is being made. For example, propagation factor differences are known to exist between arctic oceans, the Pacific Ocean and the Red Sea.

Thus, complicated control measurements or control circuits for the automatic determination of the propagation speed, as well as knowledge of the propagation speed existing at each moment are made unnecessary by the method of the present invention.

Some typical mean values of the propagation speed in:

arctic oceans — 1430 m/sec
Pacific ocean — 1470 m/sec
Red Sea — 1570 m/sec

A numerical example based on the conditions depicted at the left-hand side of FIG. 1 proves the high quality of distance determination according to the present invention in which a determination of a "perpendicular distance" is accomplished by applicant's novel "oblique reflected beam ranging".

For the angle $\beta = 45°$ and an average propagation speed $Cm = 1500$ m/sec, the measuring error in the determination of the distance 2 is computed as follows:

For layer S1 the following applies:

$$\sin \alpha / C1 = \sin \beta / Cm, \text{ and } C\,1 = 1510 \text{ m/sec}$$

$$\sin \beta = (1510/1500) \cdot \sin 45° = 0.71188$$

$$\alpha = 45° \, 26 \cdot 4'$$

$$\sin 2\alpha = \sin 90° \, 52.8' = \sin 89° \, 7.2' = 0.99988$$

For a distance determination that $h1 = 20$ m in layer S1 an error "51" results as follows:

Error "S 1" = $h_1 [(1/\sin 2\beta) - (1/\sin 2\alpha_1)]$ $= 20 [(1 - (1/0.99988)] (m)$ $= -0.24$ cm.

Furthermore, for the layer S2 the following applies:

$\sin\alpha_2 / C_2 = \sin\beta / Cm$, and $C_2 = 1470$ m/sec $\sin\alpha_2 = (1470/1500) \sin 45° = 0.69307$ $= 43° 52.4'$ $\sin 2\cdot\alpha_2 = \sin 87° 44.8' = 0.99923$, and thus:

Error "S 2" = $h_2 [(1/\sin 2\beta) - (1/\sin 2\alpha_2)]$, where $h_2 = 30$ m $= 30 [1 - (1/0.99923)] = -2.3$ cm For layer S3 the following applies:

$\sin\alpha_3 / C_3 = \sin\beta / Cm$, and $C_3 = 1530$ m/sec $\sin\alpha_3 = (1530/1500) \cdot \sin 45° = 0.72135$ $\sin\alpha_3 = 46° 10'$ $\sin 2\alpha_3 = \sin 92° 20' = \sin 87° 40' = 0.99917$.

The error is here:

Error "S 3" = $h_3 [(1/\sin 2\cdot\beta) - (1/\sin 2\cdot\alpha_3)]$, where $h_3 = 700$ m $= 700 [1 - (1/0.99917)] = -58.1$ cm.

The true value for distance 2 is 750 m; with the method according to the present invention the distance 2 is determined to be:

Distance 2 = 750 + Error "S1" + Error "S2" + Error "S3"

Distance 2 = 750 − 0.6 = 749.4m.

Thus the measuring error in the determination of distance 2 according to the method of the present invention is only 60 cm or 0.08 percent, while in the distance determination according to the conventional methods the error was 13.35 m, or 1.78 percent.

The numerical example clearly shows the measuring accuracy level which can be achieved by the method of the present invention, because an error of less than 1 part per thousand lies in an order of magnitude which can definitely be considered to be negligibly small.

Figure 2:
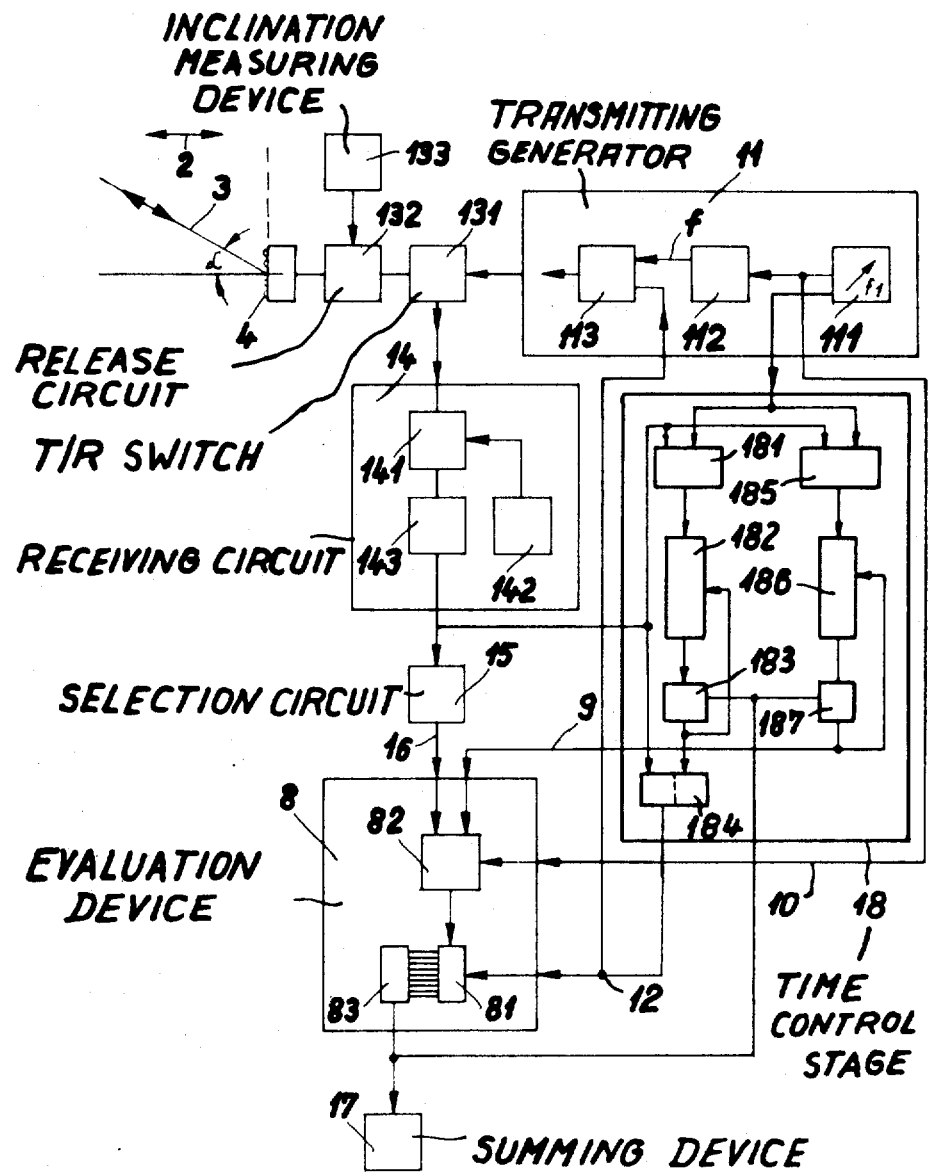
FIG. 2 is a block circuit diagram of an electronic evaluation system for carrying out a distance measurement according to the method of the present invention.

FIG. 2 shows a system utilizing an electronic evaluation device 8 for measuring and indicating distances according to the method of the present invention. The evaluation device 8 consists of a time measuring device in the form of a digital counter 81, which is controlled via a gate 82 and which is connected to any desired kind of memory 83. During the time interval to be measured, a control signal 9 opens gate 82 and counting pulses transmitted over line 10 are counted into digital counter 81. The counting pulses are produced at a repetition frequency f1 by a counting pulse generator 111 which is part of a transmitting generator 11. The repetition frequency f1 is set in the counting pulse generator 111. By frequency division of the repetition frequency f1 in a frequency divider 112, the frequency f for controlling the transducer elements 4 is derived. A control member 113 is connected to the output of frequency divider 112.

Figure 2A:
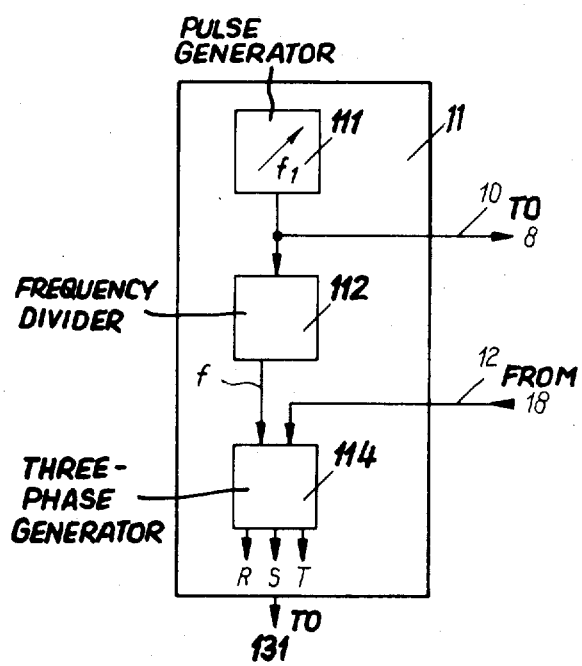
FIG. 2a is a detailed block circuit diagram of a three-phase transmitting generator which can be employed in the circuit of FIG. 2.

In the embodiment shown in FIG. 2a, the control member 113 is a three phase transmitting generator 114 which produces from the one output voltage of frequency f of frequency divider 112 three output voltages R, S and T which are electrically shifted in phase relative to one another by 120° and amplified. Such a system is disclosed in my above cited U.S. application Ser. No. 850,146.

A control signal applied via line 12 determines the phase order of the transmission by the three phase transmitting generator 114. The transducer elements 4 are excited, via a transmitting-receiving switch 131 and a release circuit 132, by the output voltages R, S and T at the above-mentioned frequency f, whose value is determined by the value of repetition frequency f1 in such a manner that the radiated sound energy propagates at an angle $\alpha$ which results in an angle $\beta$ having an average value of 45°, as described in connection with FIG. 1.

With a fixed phase difference of 120° between the output voltage R, S and T, the angle $\alpha$ at which the sound energy propagates is determined only by the frequency f which together with repetition frequency f1 is varied in counting pulse generator 111, the frequency f being derived from the repetition frequency f1 by frequency division.

The release circuit 132 is controlled by any desired and known platform inclination measuring instrument 133 and is opened for transmitted or received signals only when the plane 5 of transducer elements 4 is perpendicular to the distance 2 of interest, i.e. in the example of the ocean depth profile survey the plane 5 is horizontal.

To simplify the description of the various embodiments, it is assumed that the same transducer elements 4 are used for transmitting as well as for receiving, this generally being the custom in the echo sounding art.

Figure 2B:
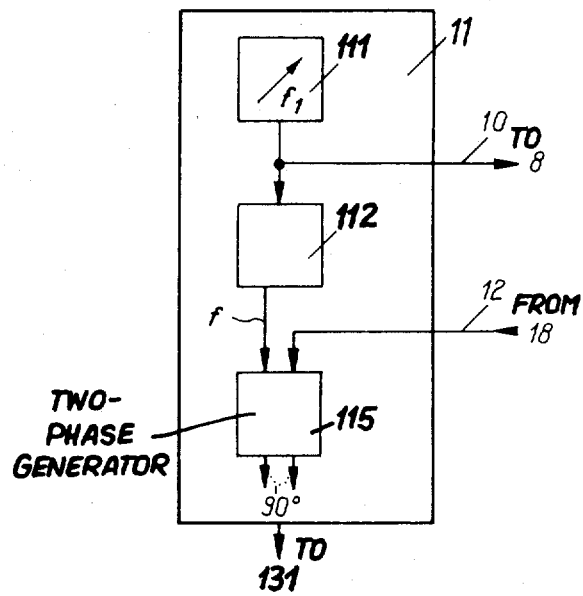
FIG. 2b is a detailed block circuit diagram of a two-phase transmitting generator for use in the circuit of FIG. 2.

A further embodiment of transmitting generator 11 is shown in FIG. 2b. A two phase transmitting generator 115 is connected to frequency divider 112 in order to furnish from the output voltage of the frequency divider 112 two amplified output voltages each at frequency f and shifted in phase by 90° with respect to one another to excite the transducer elements 4. Here, too, the control signal on line 12 determines the transmitting sequence and the duration of the transmitting period. The repetition frequency f1 and thus frequency f is so selected that the angle $\beta$ again is about 45°. An embodiment of the two phase transmitting generator 115 with a control of the transducer elements to radiate sound energy at a selected angle is disclosed in detail in German Offenlegungsschrift No. 1,812,643.

Figure 2C:
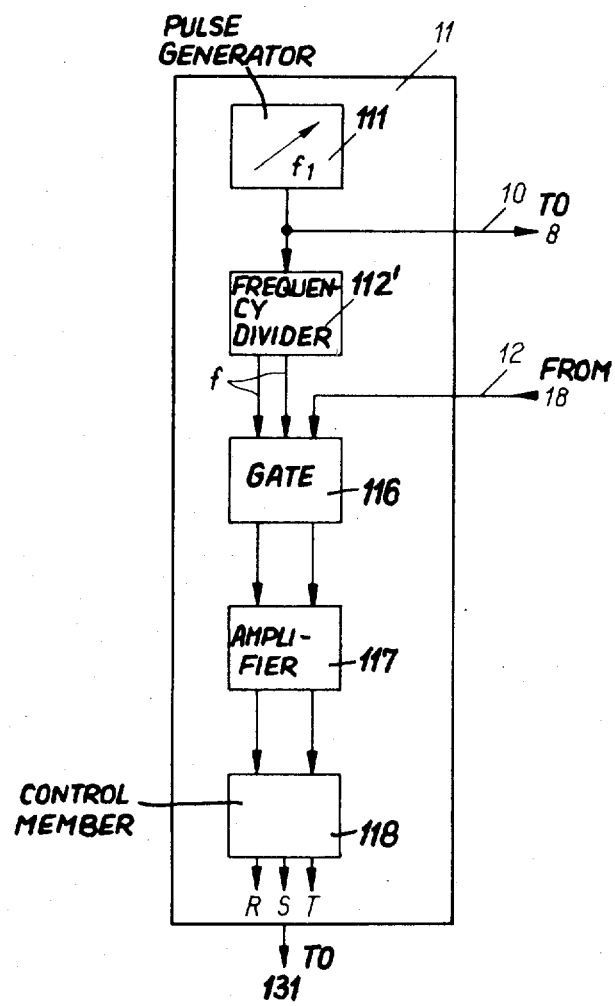
FIG. 2c is a detailed block circuit diagram of a transmitting generator which converts a two-phase voltage into a three-phase output voltage and which can be used in the circuit of FIG. 2.

FIG. 2c shows a further variation of the transmitting generator 11. Here a frequency divider 112' is connected to counting pulse generator 111 and serves to furnish two output voltages both at the frequency f which are electrically shifted in phase by 90° relative to one another. These two voltages are fed to an amplifier 117 through a gate 116 which is opened during a transmitting period by a control signal on line 12. The amplifier 117 is connected at its output to a three phase control member 118. The three phase control member 118 is, for example, a Scott transformer whose output voltages R, S and T are electrically shifted in phase by 120° with respect to one another and which excite the transducer elements 4 at frequency $f$. Such an arrangement is disclosed in detail in my above-cited U.S. application Ser. No. 120,608.

Returning to FIG. 2, the reflected components of the sound energy beam 3 received by transducer elements 4 are conducted over release circuit 132 and transmitting-receiving switch 131 and are initially mixed and amplified in an intermediate frequency amplifier 141, demodulated in a rectifier 143 and then fed to a pulse time centroid determination circuit 15, which will be described in connection with FIG. 5. The output of circuit 15 is connected to gate 82. At the instant corresponding to the centroid along the time axis of the area enclosed by the time waveform of the sound energy pulse the selection circuit 15 emits a pulse via line 16 which again blocks gate 82 to halt the delivery of counting pulses from line 10. The contents of counter 81 can thereafter be transferred into memory 83 from which they can be displayed or printed. This value is then the measured distance which also corresponds, for angle $\beta = 45°$, to the distance along travel path 7 to the location of the point being measured. The measured value is added in a summing device 17 to the momentary position of the transducer elements 4, as determined in any known manner, to indicate the location of the point of reflection 6. The position indication of the point of reflection 6 is displayed or printed in the same manner as the associated distance 2.

During the transmitting period, gate 82 is opened by a control signal applied via line 9 and control member 113 is opened by a control signal on line 12, the latter signal simultaneously returning counter 81 to its starting condition.

The control signals delivered over lines 9 and 12 are formed in a known time control stage 18. The control signal on line 12 determines, by its pulse duration, the duration of the transmitting period. In dependence on the measured distance, the pulse duration of the control signal on line 12 is set in the time control stage 18 by the output signal of the evaluation device 8. The transmitting rate is determined by the pulse rate of the control signal on line 12. The control signal on line 9 is emitted by time control stage 18, for example, at the middle of the transmitting period so that gate 82 is then open for conveying the counting pulses delivered via line 10. To produce the signal on line 12 the time control stage 18 may consist of a gate circuit 181, a first counter 182, a comparator 183 and a flip flop 184. At the end of the echo the first counter 182 starts counting and stops when its contents is equal to that of the store 83. Through a gate circuit 185 at the same time a second counter 186 starts counting twice as fast as the first counter 182. A comparator 187 giving signal on line 9 is connected with the second counter 186 and the store 83.

Figure 3:
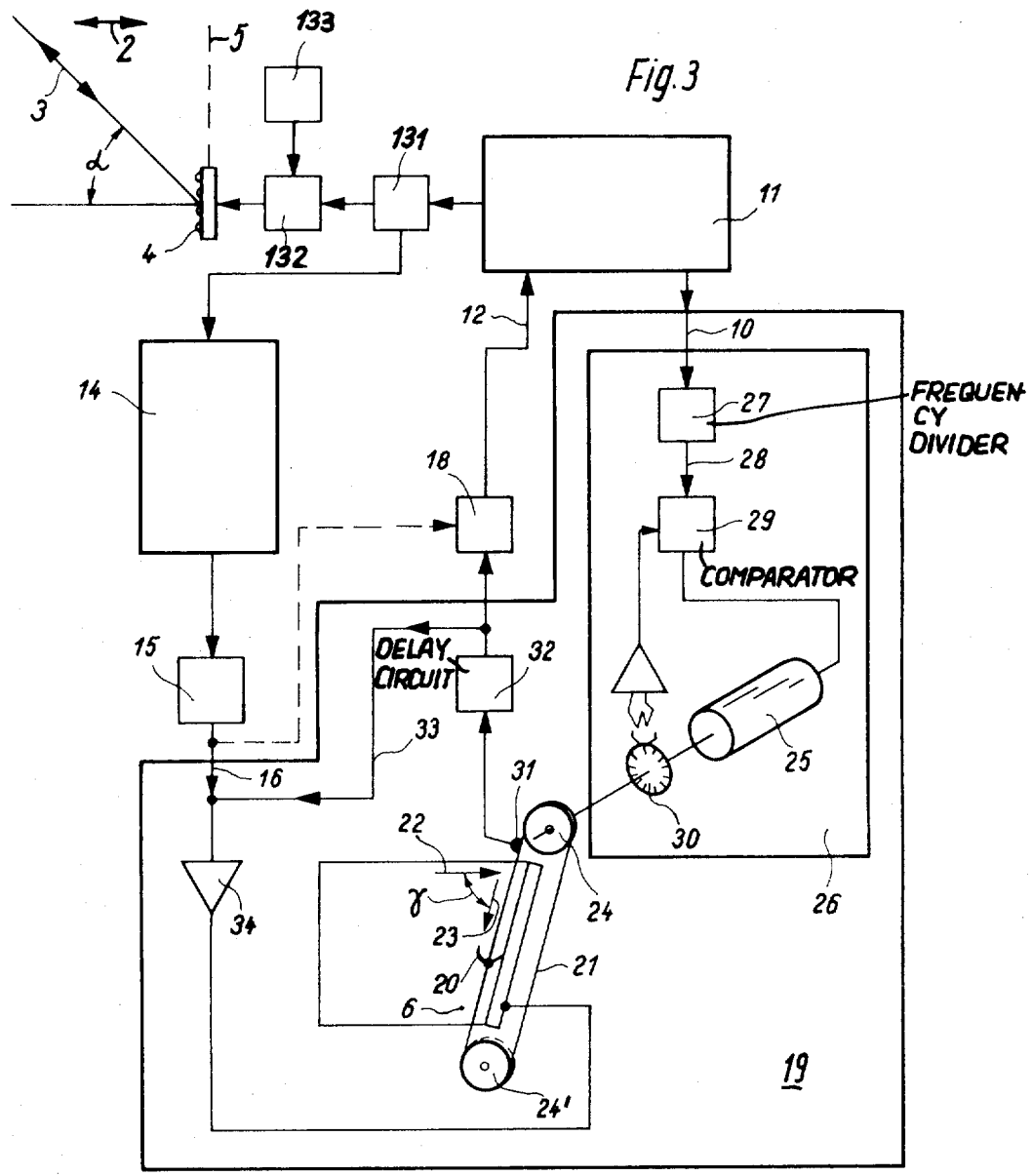
FIG. 3 is a block circuit diagram of an electromechanical evaluation system for carrying out the method of the invention and including a recording instrument whose time proportionally deflected recording member moves at an angle $\gamma$ with respect to the paper advance direction.

In the electromechanical evaluation system shown in FIG. 3, a recording device 19 records the ocean depth profile to be surveyed. The recording device 19 is a known type of echograph effecting a linear writing movement of its recording member, consisting of a stylus 20 which is fastened to a stylus band 21 and which advances at a constant speed $v$. Contrary to the arrangement employed in conventional echographs, the angle between the paper advance direction 22 and the stylus movement direction 23 is not 90° but rather one of the guide rollers 24, 24', preferably guide roller 24', is displaced to pivot stylus band 21 to lie at an angle $\gamma$ with respect to the paper advance direction in order to assure a true position marking of the point of reflection 6.

The stylus band 21 is driven, for example by a motor 25 via guide roller 24', the number of revolutions, and speed, of the motor being derived from the repetition frequency f1 of the counting pulses on line 10 so that it is proportional to the frequency f of the sound energy radiation. In a known speed regulation circuit 26 the counting pulses delivered by line 10 are fed as the input signal to a frequency divider 27 and the output signal from divider 27 is delivered via line 28 to a comparator 29, for example in the form of a phase modulator, to be compared with a value which corresponds to the number of revolutions of the motor 25 and picked up by a speed transducer 30, in the form of a pickup disc, from the drive shaft of motor 25. The output signal of the comparator 29 controls motor 25 and thus closes the circuit of the speed regulation circuit 26.

Instead of motor 25 and the speed regulation circuit 26, it is also possible to use a stepping motor which is controlled directly by the output signal on line 28 from the frequency divider 27.

The stylus 20 at the stylus band 21 continuously moves along its closed travel path. Upon passage of the stylus 20 past sensor contact 31, a delay circuit 32, for example in the form of a monostable multivibrator, is started. The output signal from circuit 32 is delivered via line 33 to the time control stage 18 for synchronizing the emission of its control signal via line 12 and is simultaneously delivered to control an amplifier 34 to cause the stylus 20 to produce a mark indicating the position of the transducer elements 4.

At the centroid relative to time of the reflected components of the sound energy beam 3 there then appears at the output of the centroid selection circuit 15 a pulse on line 16 which controls, via amplifier 34, the stylus 20 to produce a mark indicating the distance to the point of reflection 6. When, for example, a current-sensitive recording paper is used, this is done by applying a current surge.

The pulse duration of the control signal on line 12 can here be set in the time control stage 18 in dependence on the determined distance by the time relation between the output signal on line 33 and the subsequent pulse on line 16.

Figure 4:
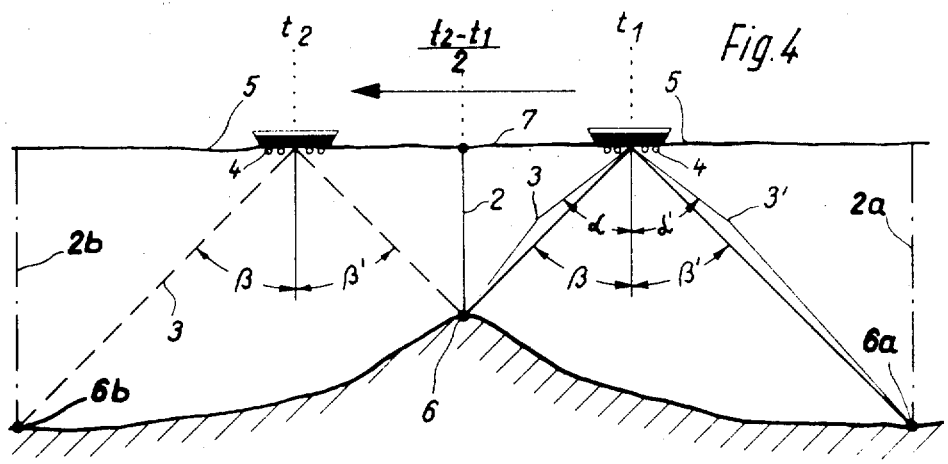
FIG. 4 is a pictorial view illustrating the recording of the ocean depth profile for the determination of distances.

There also exists the possibility, however, of recording the distances to be determined and the positions of the associated reflection points 6 by means of a conventional echo-graph in which the movement of the stylus is perpendicular to the direction of paper advance. As shown in FIG. 4, it is necessary in order to determine the position coordinates, to emit sound energy beam 3 at an angle $\alpha$ toward the bow of the ship and sound energy beam 3' at an angle $\alpha'$ toward the stern of the ship, both beams being in plane 5, the magnitude of the angles $\alpha$ and $\alpha'$ being identical and the transducer elements 4 moving in the plane containing the beams.

Figure 4A:
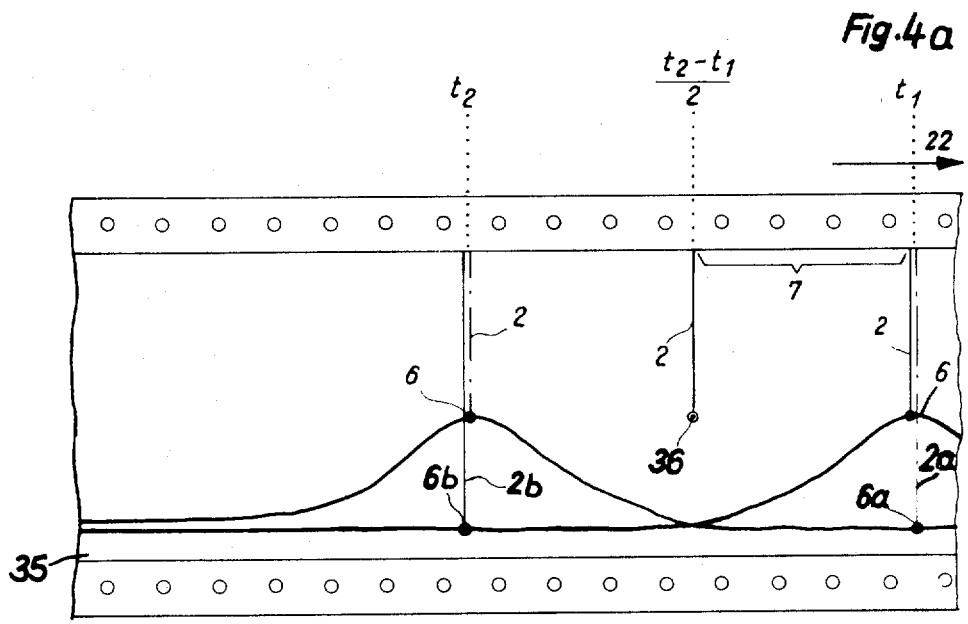
FIG. 4a is a pictorial view of the resulting double recording.

At time $t1$, the points of reflection 6 and 6a at distances 2 and 2a are marked on a recording strip 35, as shown in FIG. 4a. By time $t2$ the transducer elements 4 have reached such a position that the point of reflection 6 is now struck by the sound energy beam 3' and is marked on the recording strip 35, while the sound energy beam 3 impinges at the distance 6b which corresponds to reflection point 6b. Distance 2 is thus determined twice in succession with the aid of sound energy beams 3 and 3' and its position along the ship travel path with respect to the position of transducer elements 4 at time $t1$ is indicated by distance 7 which corresponds to one-half the distance traveled by the ship between times $t2$ and $t1$. Point 36 on the recording strip 35 thus indicates the determined vertical distance 2 together with the position of the associated point of reflection 6 which has been derived from an addition of the position of the transducer elements 4 at time $t1$ and the distance 7.

Figure 5:
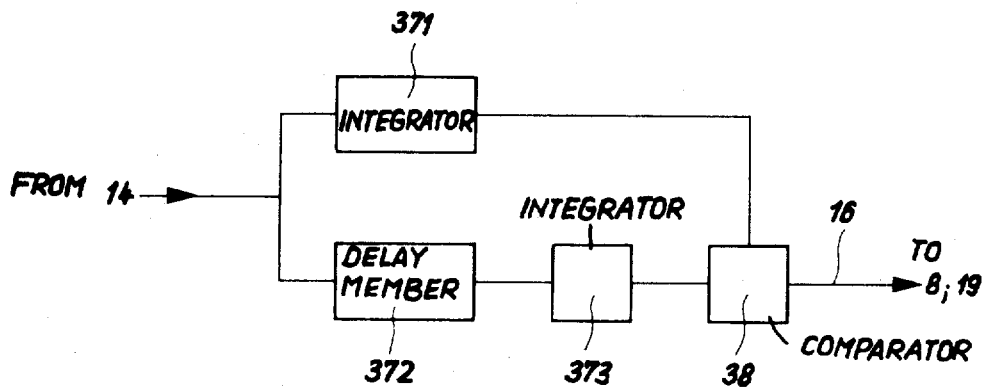
FIG. 5 is a block circuit diagram of a selection circuit which may be provided in the circuits of FIGS. 2 and 3.

FIG. 5 is a block circuit diagram of one embodiment of centroid selection circuit 15. The time sequence of the output signal from receiving circuit 14 is integrated in a first integrator 371. In a parallel processing channel the output signal from receiving circuit 14 is delayed in a delay member 372 by a period longer than one transmitting period and is fed into a second integrator 373. A comparator 38 compares the time sequence of the integration value at the output of the second integrator 373 with one-half the integration value of the first integrator 371, and then emits a pulse on line 16 at its output when the integration value of the second integrator 373 is equal to one-half the integration value of the first integrator 371. This output pulse is delivered to devices 8 and 19.

Figure 6:
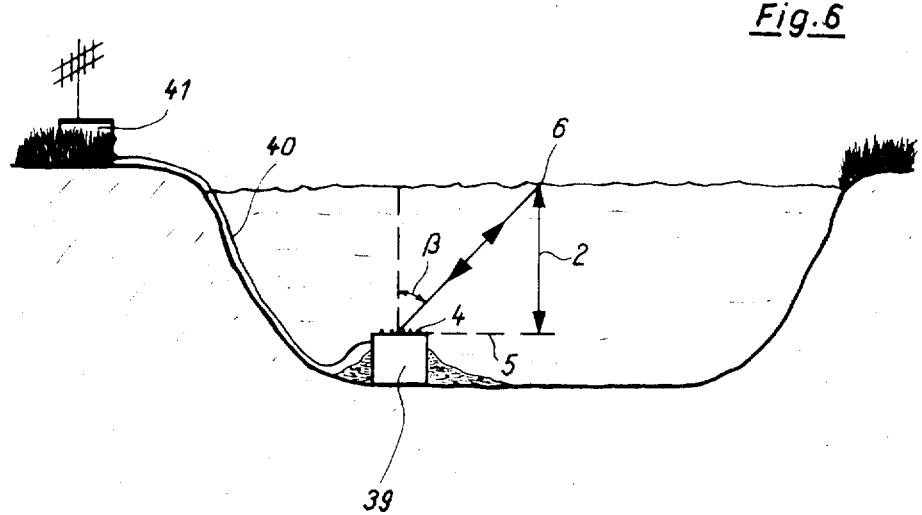
FIG. 6 is a pictorial view of a device provided with locally permanently installed transducer elements for monitoring the water level according to the method of the present invention.

FIG. 6 shows a device for water level monitoring. The transducer elements 4 are fastened at the bottom of a body of water on a base 39 in order to not be covered by silt deposits from the water flowing around them. The transducer elements 4 are again so controlled that the average value of angle $\beta$ is approximately 45°. At the point of reflection 6 at the surface of the water, components of the sound energy beam 3 are reflected. The data determined therefrom may be transmitted, for example via a connecting line 40, to a station 41 on land and may there be displayed or telemetrically further transmitted.

The construction and component expenses for such a water level measuring station are much lower than for the previously required "water level houses" which require a building with a measuring shaft in the body of water and appropriate bottom conditions for a foundation, and possibly also an access pier and the like. Moreover, maintenance work required for the conventional electromechanical control instruments, which include flotation rods with end switches and the like, are also eliminated. Water level measurements according to the pressure measuring principle have not found acceptance in practice for accurate measurements, inter alia because layers of structurally different soiling and of different degrees of soiling strongly falsified the measurements. These possible interfering influences are ineffective in the method according to the present invention because the same level of measuring accuracy is always assured with the oblique radiation of sound energy independent of the conditions of the medium in the form of layers having changing and different wave transmission characteristics.

It will be understood that the above description of the present invention is susceptible to various modifications, changes and adaptations, and the same are intended to be comprehended within the meaning and range of equivalents of the appended claims.

I claim:

1. A method for determining the component in a given direction of a distance to a point through a sound energy transmission medium which can have layers of different transmission characteristics, comprising the steps of:

providing an electroacoustic transducer composed of a plurality of individual regularly spaced transducer elements disposed in a plane perpendicular to the component direction;

applying alternating electrical signals to the elements for causing the transducer to produce a first directed beam of sound energy, the signals applied to the elements having a constant phase relation to one another and all being at the same frequency whose value determines the angle which the directed sound energy beam forms with such component;

determining the time elapsed between the transmission of such sound energy and reception at the transducer of a portion of the energy reflected from the point; and combining a representation of such elapsed time with a function of the electrical signal frequency to produce an indication of the value of such distance component.

2. A method as defined in claim 1 wherein said step of applying is carried out by applying discrete pulses of such signals to the elements and said step of determining is carried out by detecting the centroid along the time axis of each transmitted pulse and corresponding received reflected pulse.

3. A method as defined in claim 1 wherein the step of applying is carried out by adjusting the frequency of the electrical signals, taking into consideration the propagation speed of sound through the transmission medium, for causing the angle formed by the directed sound energy beam with respect to such a component to have a value of approximately 45°, and varying the frequency of the electrical signals upon the occurrence of a substantial change in the value of such propagation speed.

4. A method as defined in claim 3 comprising the further steps of deriving from such indication an indication of the value of the component of the distance to the point in a direction parallel to the plane of the transducer elements and superimposing the indication of the value of the component in a direction parallel to said plane on an indication of the location of the transducer.

5. A method as defined in claim 1 wherein said step of combining is carried out employing an electromechanical recording device having a recording member and a record surface moveable with respect to the recording member, comprising driving the recording member linearly at an angle to the direction of movement of the record surface which is a function of the angle which the directed sound energy beam forms with the direction component and at a speed proportional to the frequency of the electrical signals.

6. A method as defined in claim 1 wherein said step of applying alternating electrical signals is carried out to produce a second directed beam of sound energy which is oriented in the opposite direction from, and at the same angle as, the first beam with respect to the component direction, said step of determining is carried out with respect to both directed beams, and said step of combining is carried out utilizing an echograph recording device having a recording member mounted to move perpendicularly to the direction of movement of a record surface, and comprises recording the indications derived from both beams on the same record surface and with respect to the same time axis to produce two substantially identical echogram curves which are shifted relative to one another along such time axis, and averaging the indications provided by the two echograms for each point whose distance is to be determined.

7. Apparatus for determining the component in a given direction of a distance to a point through a sound energy transmission medium which can have layers of different transmission characteristics, comprising, in combination:
- an electroacoustic transducer composed of a plurality of individual regularly spaced transducer elements disposed in a plane perpendicular to the component direction;
- means connected for applying alternating electrical signals to said elements for causing said transducer to produce a first directed beam of sound energy, the signals applied to said elements having a constant phase relation to one another and all being at the same frequency whose value determines the angle which the directed sound energy beam forms with such component;
- means connected for determining the time elapsed between the transmission of such sound energy and reception at said transducer of a portion of the energy reflected from the point; and
- means connected to said determining means and said applying means for combining a representation of such elapsed time with a function of the electrical signal frequency to produce an indication of the value of such distance component.

8. An arrangement as defined in claim 7 wherein said means for applying electrical signals comprise a three-phase transmitting generator connected for applying each of its output phase signals to respective ones of said transducer elements.

9. An arrangement as defined in claim 7 wherein said means for applying electrical signals comprise a two-phase transmitting generator connected for applying each of its output phases to respective ones of said transducer elements.

10. An arrangement as defined in claim 7 wherein said means for applying electrical signals serve to provide pulses of such signals, and further comprising a selection circuit connected between said transducer and said time determining means for applying to said time determining means a signal indicating the instant of occurrence of the centroid, with respect to time, on each received reflected sound energy pulse.

11. An arrangement as defined in claim 10 wherein said selection circuit comprises:

- a first integrator having its input connected to receive the reflected pulse signals received by said transducer;
- a second integrator having its input connected to the output of said delay member; and
- a comparator having two inputs each connected to the output of a respective one of said integrators and arranged to produce an output signal when the output value from said second integrator becomes equal to one-half the output value from said first integrator for each received reflected pulse.

12. An arrangement as defined in claim 10 further comprising means for producing a time base signal whose frequency is proportional to the frequency of the alternating electrical signals applied to said elements, and wherein said combining means are connected for producing an indication of the number of cycles of the time base signal occurring during the elapsed time between the transmission of a sound energy pulse and the occurrence of an output from said selection circuit.

13. An arrangement as defined in claim 7 further comprising summing means connected to the output of said combining means and also connected to receive an indication of the instantaneous position of said transducer for providing an indication of the location of the point whose distance is to be determined parallel to the plane of said transducer elements.

14. An arrangement as defined in claim 7 wherein said combining means include an electricomechanical recording device comprising a recording member, a record surface moveable with respect to said recording member, means supporting said recording member for movement relative to the direction of movement of said record surface at an angle which is less than 90° and which is a function of the angle which the directed sound energy beam forms with the direction component, a motor connected for driving said recording member, and speed control means connected for driving said motor at a speed proportional to the frequency of the electrical signals.

15. An arrangement as defined in claim 7 wherein said applying means comprise means for controlling the phase sequence of the electrical signals for producing a second directed beam of sound energy which is oriented in the opposite direction from, and at the same angle as, the first beam with respect to the component direction, said determining means are connected for determining the elapsed time with respect to both directed beams, and said combining means are composed of an echograph recording device comprising a record surface mounted for movement in a first direction, a recording member mounted for movement perpendicular to the first direction, and a speed control circuit connected for driving said recording member at a speed proportional to the frequency of the electrical signals.

16. An arrangement as defined in claim 7 further comprising inclination measuring means connected to said transducer for providing an indication whenever the plane of said transducer elements has a horizontal orientation, and a gate circuit connected between said transducer elements and said applying means for permitting the passage of electrical signals to said transducer elements only during the times when an indication is being produced by said inclination measuring means.

17. An arrangement as defined in claim 7 further comprising a pulse duration controlled time control stage having an input connected to said combining means and an output connected to said applying means for causing said applying means to provide electrical signal pulses whose duration is determined by the indication produced by said combining means.

18. An arrangement as defined in claim 7 wherein said transducer is permanently installed near the bottom of a body of water whose depth is to be measured and is arranged for directing a sound energy beam toward the surface of such water body, said determining means and combining means are disposed at a location remote from said transducer and outside of the water body, and further comprising signal transmission means connected between said transducers and said determining means.

* * * * *